United States Patent Office 3,418,337
Patented Dec. 24, 1968

3,418,337
HEXAFLUORO-2-PROPANOL AND ITS COMPLEX WITH TETRAHYDROFURAN
William J. Middleton, Wilmington, Del., assignors to E. I. du Pont de Nemours and Company, Wilmington, Del., a corporation of Delaware
No Drawing. Continuation-in-part of application Ser. No. 238,703, Nov. 19, 1962, which is a continuation-in-part of application 107,302, May 3, 1961. This application Mar. 27, 1964, Ser. No. 355,433
2 Claims. (Cl. 260—347.8)

This application is a continuation-in-part of my copending application Ser. No. 238,703, filed Nov. 19, 1962 (now U.S. Patent 3,227,674), itself a continuation-in-part of my application Ser. No. 107,302, filed May 3, 1961, and now abandoned.

This invention relates to a new fluoroalcohol and to the preparation thereof.

The new product of this invention is 1,1,1,3,3,3-hexafluoro-2-propanol, i.e., the alcohol having the formula $CF_3$—CHOH—$CF_3$. This product will hereinafter be referred to by its alternative and shorter name 2H-hexafluoro-2-propanol.

2H-hexafluoro-2-propanol is prepared by reduction of hexafluoroacetone. Reduction can be effected chemically, by bringing hexafluoroacetone in contact with a complex alkali metal hydride, such as lithium aluminum hydride; or catalytically, by subjecting hexafluoroacetone to the action of hydrogen under pressure in the presence of a hydrogenation catalyst such as platinum oxide.

The complex alkali metal hydrides suitable for the reduction of hexafluoroacetone may be represented by the general formula $XYHZ_3$, where X is an alkali metal, preferably lithium, sodium or potassium; Y is aluminum or boron; and all three Z's are hydrogen or lower alkoxy. The preparation and reactions of these complex hydrides have been reported in the recent literature. Specific examples of these materials include lithium aluminum hydride, $LiAlH_4$; sodium aluminum hydride, $NaAlH_4$; sodium triethoxyaluminohydride, $NaAlH(OC_2H_5)_3$; the lithium trialkoxyaluminohydrides, $LiAlH(OR)_3$, where R is ethyl, tert. butyl, tert. amyl; lithium borohydride, $LiBH_4$; sodium borohydride, $NaBH_4$; potassium borohydride, $KBH_4$; and the sodium trialkoxyborohydrides,

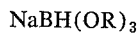

$NaBH(OR)_3$ where R is methyl, ethyl, isopropyl or tert. butyl.

These agents vary somewhat in reducing power. Thus, while lithium or sodium aluminum hydride is operable at external temperatures as low as 0° C. or even lower (the reaction is, in fact, exothermic and external cooling may be needed), the trialkoxyaluminohydrides usually require somewhat elevated temperatures, of the order of 50–100° C., for a practical reaction rate. Conversely, the trialkoxyborohydrides are active at ordinary or slightly elevated temperature, but with lithium or sodium borohydride mild heating is desirable, e.g., temperatures of 50–100° C.

The reduction is conducted in an inert liquid medium which dissolves the reactants to at least some extent. With the aluminohydrides, which are highly moisture-sensitive, non-hydroxylic solvents should be used, and ethers such as diethyl ether, di-n-butyl ether, ethylene glycol dimethyl ether, dioxane, tetrahydrofuran and the like are particularly suitable for this purpose. The same solvents are also suitable for use with the borohydrides but in this case the presence of hydroxyl groups is not detrimental and alcohols such as methanol or ethanol, or even aqueous media, can be used.

The reducing agent is preferably used in slight to moderate excess, e.g., 10–100% molar excess over the calculated amount. At the end of the reaction this excess is destroyed, for example by addition of an alcohol or a water-miscible solvent containing some water, and the reaction mixture is acidified to decompose the metal alkoxides.

2H-hexafluoro-2-propanol possesses extremely strong hydrogen bonding properties and thus can form hydrogen-bonded complexes with solvents containing electron donor elements, such as the ethers mentioned above. These complexes are relatively stable and some of them, such as that formed with tetrahydrofuran, are even distillable without decomposition, and therefore constitute the initial reaction product. The complexes can be readily decomposed by treatment with concentrated or fuming sulfuric acid to regenerate 2H-hexafluoro-2-propanol.

The catalytic reduction method is conducted by hydrogenating an intimate mixture of hexafluoroacetone and an appropriate catalyst. Hydrogen pressures in the range of 50–3000 atmospheres, and preferably 200–1000 atmospheres, are used. A suitable range of reaction temperature is between 100 and 175° C. Any of the catalysts known to be effective in the reduction of ketones can be employed, such as platinum oxide, Raney nickel or copper-chromium oxide.

The following examples describe 2H-hexafluoro-2-propanol and illustrate its preparation.

EXAMPLE 1

Through a solution of 4 g. of lithium aluminum hydride in 100 ml. of tetrahydrofuran was passed the gas formed by evaporating 15 ml. (measured as the liquid at −78° C.) of hexafluoroacetone. The rate of addition was regulated so that the temperature of the reaction mixture was maintained at 40–50° C. by the heat of reaction. After completion of the reaction, the excess lithium aluminum hydride was decomposed by addition of aqueous tetrahydrofuran, then of 10% hydrochloric acid. The organic layer was separated and washed twice with water. The resulting 2H-hexafluoro-2-propanol/tetrahydrofuran 1:1 complex was distilled (22 g., B.P. 99–100° C.). Twenty grams of this complex was decomposed by treatment with 50 ml. of 20% oleum and the product was distilled at 1–2 mm. pressure. Redistillation of this distillate gave 17.1 g. of pure 2H-hexafluoro-2-propanol, B.P. 59° C., $n_D^{20} < 1.3$.

Analysis.—Calc'd for $C_3F_6H_2O$: C, 21.44; H, 1.20; F, 67.84. Found: C, 21.68; H, 1.20; F, 67.84.

EXAMPLE 2

A mixture of 100 g. of hexafluoroacetone and 0.5 g. of platinum oxide was subjected in an agitated reactor to a hydrogen pressure increasing from 200 to 900 atmospheres and a temperature increasing from 110 to 150° C. over a period of 6 hours. This gave 2H-hexafluoro-2-propanol in 90% yield.

2H-hexafluoro-2-propanol is a technically very valuable product. One of its important applications is its use as solvent for a wide variety of high molecular weight synthetic polymers, including some of the most intractable ones. 2H-hexafluoro-2-propanol possesses remarkable solvent power, even at room temperature, for a number of commercially useful polymeric materials, for example the formaldehyde polymers such as those described in U.S. Patents 2,768,994; 2,964,500 and 2,998,409, for which no good room temperature solvent was previously available; the polyamides, e.g., nylon 66, nylon 6, including difficultly soluble ones such as polyhexamethylene terephthalamide or poly(4,4'-dicyclohexylmethylene)adipamide; the polyesters, such as polyethylene terephthalate; poly acrylonitrile; polyvinyl alcohol; the hydrolyzed ethylene/vinyl acetate copolymers, etc. These readily prepared polymer solutions have many uses, such as the preparation of self-supporting films and of protective coatings on various surfaces, the impregnation of porous materials (e.g., paper, textile fabrics), the solution spinning of filaments, rods or tubes, the joining together of surfaces such as wood, metals or plastics, etc. Furthermore, polymeric articles (films, ribbons, tubes, plates, etc.) can be readily and quickly bonded or spliced together at room temperature by spot or surface application of 2H-hexafluoro-2-propanol, used as such or in aqueous or organic solvent solution.

Another important use of 2H-hexafluoro-2-propanol is based on its unexpected ability to form stable, extremely fine dispersions or solutions of dyes and organic pigments, including those notoriously difficulty to disperse, for example the phthalocyanine and quinacridone pigments. Among other advantages, such fine dispersions make it possible to convey the colorant particles into pore structures such as metals, ceramics or concrete, which are too small to allow penetration of larger particles. Also, the great penetrating power of 2H-hexafluoro-2-propanol for a variety of substrates such as plastics, wood or textile fibers results in intimate bonding of the colorant to the substrate.

In applications such as those just discussed, 2H-hexafluoro-2-propanol has several important advantages over the two most closely related fluoroalcohols previously reported, viz., 1,3-dichloro-1,1,3,3-tetrafluoro-2-propanol, $CF_2Cl-CHOH-CF_2Cl$ (Smith et al., Ind. Eng. Chem., 49, 1241 (1957)), and 2H-decafluoro-2-pentanol, $CF_3-CHOH-(CF_2)_2CF_3$ (Haszeldine, J. Chem. Soc., 1953, 1748).

First, 2H-hexafluoro-2-propanol (B.P. 59° C./760 mm.) is the most volatile polyfluoroalcohol known. This property makes it particularly valuable as a polymer solvent or pigment dispersant, since it is quickly removed at room temperature from articles made from, or treated with, such solutions or dispersions. In comparison, the two fluoroalcohols mentioned above boil at 108° C./760 mm. and 51–52° C./209 mm., respectively.

Second, 2H-hexafluoro-2-propanol is miscible with water in all proportions whereas, at room temperature, $CF_2Cl-CHOH-CF_2Cl$ is soluble to less than 10% by volume and $CF_3-CHOH-(CF_2)_2CF_3$ is soluble to less than 3% by volume. Water-miscibility is a desirable property in uses such as adhesive bonding of polymeric materials or dyeing of textiles. Polymer solutions in 2H-hexafluoro-2-propanol are much more tolerant to water than those in which the solvent is not water-miscible.

Additionally, 2H-hexafluoro-2-propanol has the considerable advantage of low toxicity. Tests on rats showed that its approximate lethal concentration in air is 3200 p.p.m. At 1600 p.p.m., all test animals survived. 1,3-dichloro-1,1,3,3-tetrafluoro-2-propanol is much more toxic, having an approximate lethal concentration of only 1200 p.p.m.

Furthermore, 2H-hexafluoro-2-propanol is capable of dissolving a broader variety of polymeric materials than its higher homologs. For example, it dissolves commercial polyacrylonitrile readily at room temperature, whereas 2H-decafluoro-2-pentanol has no solvent effect on this polymer.

Since obvious modifications and equivalents will be evident to those skilled in the chemical arts, I propose to be bound solely by the appended claims.

The embodiments of the invention in which an exclusive property or privilege is claimed are defined as follows:

1. 2H-hexafluoro-2-propanol.
2. A complex of the compound of claim 1 with tetrahydrofuran.

References Cited
UNITED STATES PATENTS

| | | | |
|---|---|---|---|
| 2,921,940 | 1/1960 | Ramsden | 260—633 |
| 3,051,744 | 8/1962 | Bowers | 260—633 |

OTHER REFERENCES

Noller: "Chem. of Org. Cmpds.," 2nd ed., 1957, p. 734, QD 253, N 65.

Lovelace et al.: "Aliph. Fluorine Compounds," 1958, pp. 141 to 143.

Haszeldine (I): "Nature," vol. 168, (1951), pp. 1028 to 1031, QD 1, N 2.

Haszeldine (II): J. Chem. Soc., (1952), pp. 3423 to 3428, QD 1 C 6.

Haszeldine (III): J. Chem. Soc., (1953), pp. 1748, 1757, QD 1, C. 6.

LEON ZITVER, *Primary Examiner.*

J. E. EVANS, *Assistant Examiner.*

U.S. Cl. X.R.

252—364; 260—633, 33.4, 346.1, 615, 340.6